(No Model.) 2 Sheets—Sheet 1.

T. N. CLARK.
DENTAL CHAIR.

No. 508,564. Patented Nov. 14, 1893.

Witnesses.
W. J. Withrow
H. S. Young.

Inventor.
T. N. Clark.
by Fetherstonhaugh & Co
Attys.

(No Model.) 2 Sheets—Sheet 2.

T. N. CLARK.
DENTAL CHAIR.

No. 508,564. Patented Nov. 14, 1893.

Witnesses.
W. J. Withrow
C. R. Case

Inventor.
T. N. Clark
by Fetherstonhaugh & Co
attys

UNITED STATES PATENT OFFICE.

THEODORE NELSON CLARK, OF TORONTO, CANADA, ASSIGNOR TO FRANK E. CASE, OF CANTON, OHIO.

DENTAL CHAIR.

SPECIFICATION forming part of Letters Patent No. 508,564, dated November 14, 1893.

Application filed September 29, 1892. Serial No. 447,221. (No model.)

*To all whom it may concern:*

Be it known that I, THEODORE NELSON CLARK, of the city of Toronto, in the county of York, in the Province of Ontario, Canada, have invented certain new and useful Improvements in Dental Chairs, of which the following is a specification.

My invention relates to improvements in the mechanism for elevating and lowering dental chairs and the object of the invention is to provide mechanism whereby the chair may be raised or lowered and set at any desired point noiselessly, without any danger of binding and with the least possible amount of friction and it consists essentially of journaling the central screw spindle at the top and bottom between two fixed pins and providing a nut secured in the standard through which the screw spindle passes and further in connecting the governor disk to a supplemental disk by friction knuckles or dogs, which are designed to co-act with the supplemental disk in the manner hereinafter more particularly explained.

Figures 1, 2:
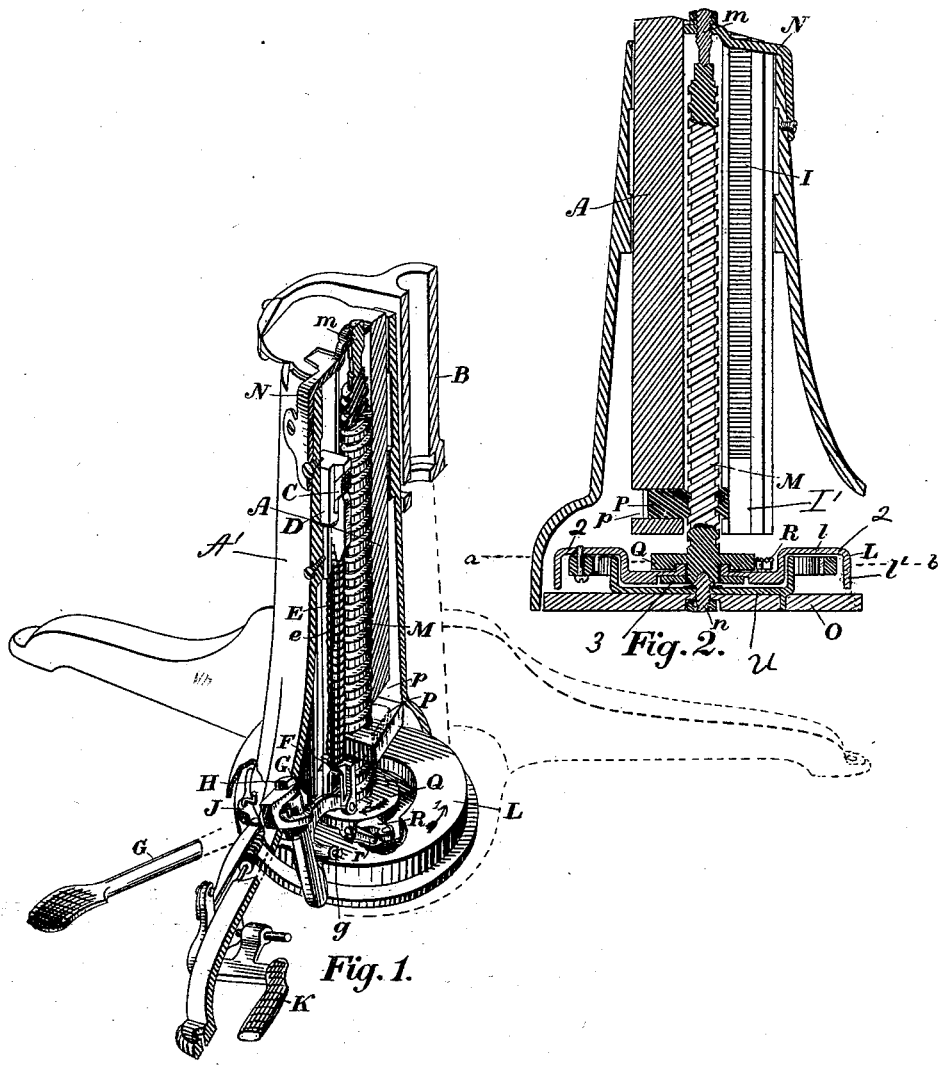
Figure 3:
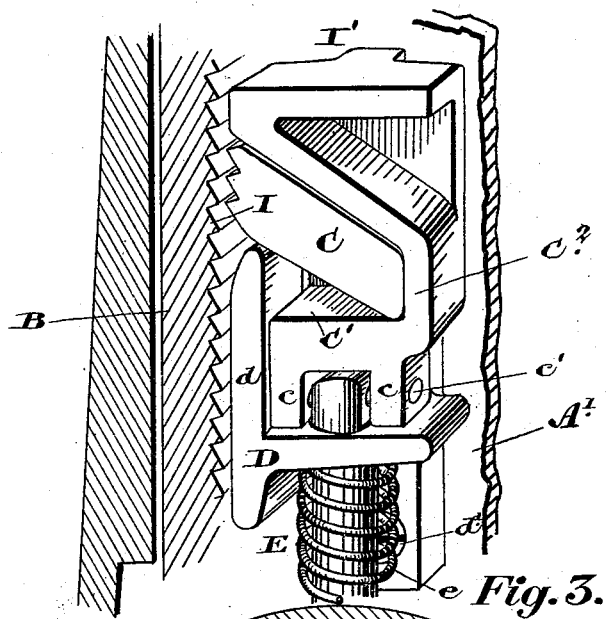
Figure 4:
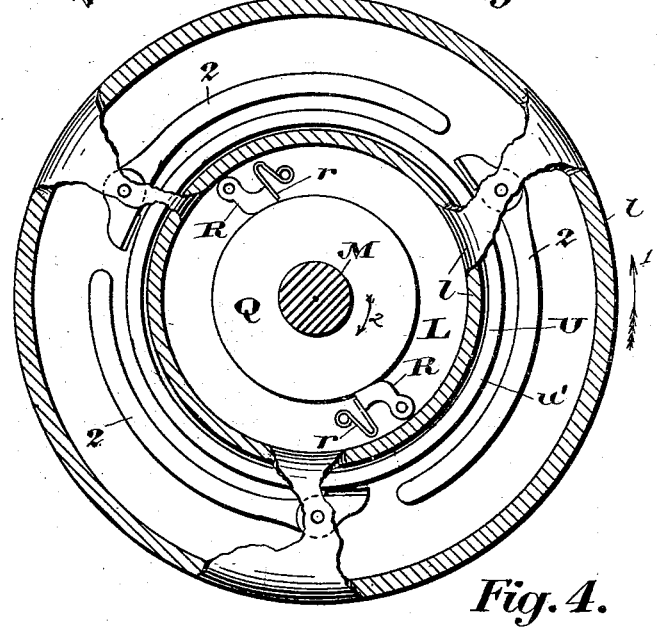

Figure 1, is a perspective view partially in section showing the principal parts involved in my invention. Fig. 2, is a vertical section on the same line as Fig. 1 looking from the opposite direction. Fig. 3, is an enlarged detail of the elevating dog and rack and casing for holding the same from the opposite side to that shown in Fig. 1. Fig. 4, is an enlarged sectional plan view below the line $a$—$b$ Fig. 2.

In the drawings like letters and numerals of reference indicate corresponding parts in each figure.

In order that my invention may be clearly understood I shall describe the means whereby the standard upon which the chair is supported is raised and also the means whereby the revolution of the governor disk is controlled.

A, is the hollow standard located within the casing, A', and having connected to it the supporting sleeve, B, in which rests the screw spindle of the chair.

C, is a dog preferably having three teeth, which is supported in position in the recess or opening, C', of the adjustable frame, C", by the upwardly extending rib, $d$, forming part of the bracket, D, which is secured to the outer casing, A', by the screw, $d'$.

E, is a rod which extends upwardly through a hole in the bracket, D, between jaws, $c$, formed at the lower end of the frame C". The rod, E, is connected to the jaws by the pin, $c'$. The lower end of the rod, E, is secured in the clevis, F, which is pivotally connected to the lever, G, which is pivoted at, $g$, in the outer standard or frame, A'.

$e$, is a spiral spring extending between the bottom of the bracket, D, and the clevis, F.

I, is a ratchet toothed rack made in the side of the vertical slot, I', of the standard, A, contiguous to the teeth of the dog, C, as shown in Fig. 3. The dog only, is shown in Fig. 1, as the teeth are on the opposite side of the slot to where the section is made and the teeth only are shown in Fig. 2, as the section in this instance is made looking from the opposite side to that shown in Fig. 1, but the construction will be understood on reference to Fig. 3, as the dog and means in which it is supported and operated are located in the slot, which extends from top to bottom of the sleeve, B.

J, is a brake operated from the pedal, K, and designed to control the rotation of the governor disk, L.

M, is a screw spindle preferably having a square thread cut on it as shown and journaled between the pin, $m$, rigidly secured in position at the top of the standard in the bracket, N, and the pin $n$, secured in position in the base, O, (see Fig. 2.)

P, is a nut, through which the screw spindle, M, extends. The nut, P, is secured in the opening, $p$, near the bottom of the standard A.

Q, is a supplemental disk rigidly secured to the bottom of the screw spindle, M.

R, are friction knuckles pivoted within the rim, $l$, on the governor disk, L, contiguous to the supplemental disk, Q.

$r$, are springs designed to cause the friction knuckles to press against the disk, Q.

U, is a circular plate which is solidly connected to the base O, by the teat, $u$, and provided with an upwardly extending flanged rim, $u'$.

The governor disk, L, is supported on the collar, 3, secured to the lower end of the screw spindle as shown and revolves upon the said collar around the screw spindle. The rim of the governor disk, L, is made reverse U-shaped and has pivoted in the top of the disk within the sides of the rim the governor friction dogs, 2, which are designed to act upon the flange of the plate, U, when the governor disk is caused to rotate in the direction indicated by arrow 1. The governor disk, L, it will be seen stands still during the period that the standard is being raised as the supplemental disk, Q, in revolving in the opposite direction freely passes the friction knuckles, R.

Having now described the principal parts involved in my invention I shall proceed to describe the manner in which the standard is raised and lowered and set in any desired position during the period that it is being raised or lowered.

In order to raise the standard, A, and consequently the chair it is necessary to press upon the pedal end of the lever, G, which action will cause the dog, C, to fall and rest upon the rib, d, so that it will come within the line of the teeth of the rack, engage the same and then raise the sleeve, B, upon which the rack is formed. When the pedal end of the lever, G, is released the dog, C, will, as the frame, C″, returns to its normal position, pass over the teeth of the rack, I. By an intermittent pressure upon the lever, G, the dog, C, will be caused to intermittently engage with and pass over the teeth of the rack, I, and in so doing the standard, A, will be raised. As, however, it is necessary to provide a means whereby the standard will remain in any position to which it is raised I provide as before described a nut, P, and supplemental disk, Q, and friction knuckles, R. As the standard is being raised, the screw spindle, M, and consequently the disk, Q, is turned in the direction indicated by arrow 2 by the nut, P. If it were not for the supplemental disk, Q, the standard would fall of its own gravity as much as it would be raised by the dog, C, as the nut, P, acting on the screw spindle so as to revolve it in the opposite direction would cause the standard to fall but immediately the dog is released so as to be brought back over the ratchet toothed rack, I, the friction knuckles, R, come in contact with the supplemental disk, Q. The brake, J, being now applied to the outer periphery of the governor disk, L, will prevent the screw spindle from rotating in the opposite direction to that indicated by arrow 2 thereby holding the standard in any position it may be raised to without any lost motion whatsoever. The friction knuckles are of course arranged so that they will allow the friction disks to run free in revolving in the direction indicated by arrow 2 but press upon it and prevent its revolution should it have a tendency to revolve in the opposite direction.

It will also be understood that during the period that the standard is being elevated the brake, J, is applied to the governor disk, L. When it is desired to lower the standard the foot is pressed upon the pedal, K, so as to disengage the brake, J, with the governor disk, L, and the governor disk, L, and supplemental disk, Q, being now connected together will revolve together, thereby allowing the standard to fall. During the period that the standard, A, is descending the tails of the dogs, 2, pivoted within the rim of the governor disk are caused by the centrifugal force of the governor disk in rotating in the direction indicated by arrow 1 to fly outward and thereby cause the shoes or bearing faces of said dogs to press against the annular flange on the plate, U, thereby retarding the motion of their governor disk and causing the chair to descend gradually. Immediately upon the pedal, K, being released it will be understood from what has been before described, that the descent of the standard will be immediately stopped by the friction knuckles, R, pressing upon the supplemental disk, Q, and the chair will be held securely in the exact position in which it is situated at the time of the release of the pressure of the foot from the pedal, K.

Although I show two friction knuckles and disk it will of course be understood that a ratchet wheel and dog might be used as an equivalent means but I prefer the form shown on account of it being noiseless.

I am aware that it is not new to provide a hollow standard such as is shown and described and am also aware that the dog, C, and rack with which it engages and the manner in which it is actuated are also known and therefore I do not lay claim specifically to the means by which the hollow standard is raised and the means by which the rapidity of the descent of the standard is controlled but I do not know of any invention in which the chair may be raised and lowered and set at any desired point, practically noiselessly, in the manner hereinbefore described.

What I claim as my invention is—

1. In a dental chair, the combination of the outer standard, the inner hollow standard vertically movable therein carrying a rack, a dog for engaging the rack, a foot lever with connections to said dog, a vertical screw spindle journaled in the end walls of the outer standard, a supplemental disk rigidly carried on the lower end of said spindle, a nut loosely mounted on the spindle and engaging a recess in the wall of the inner standard, a governor disk journaled upon the lower end of the spindle, friction knuckles carried thereby adapted to engage the rigid disk and a brake normally in engagement with said governor disk, substantially as described.

2. In combination, the outer standard, the inner standard vertically movable therein carrying a rack, a manually operated dog engaging said rack to raise the standard, pins secured at either end of the outer standard, a screw spindle journaled upon said pins within the inner standard, a nut loosely carried by said spindle, and engaging a recess in said standard, a supplemental disk rigidly connected to said spindle near the lower end, a governor disk rotating about the spindle, friction knuckles carried by the governor disk for engaging the supplemental disk, and a brake for normally preventing the rotation of the governor disk, a rigid circular flange, and friction shoes carried by the governor disk for engaging said flange, substantially as described.

THEODORE NELSON CLARK.

Witnesses:
B. BOYD,
H. G. S. YOUNG.